United States Patent
Okuda et al.

(10) Patent No.: US 10,917,851 B2
(45) Date of Patent: Feb. 9, 2021

(54) INFORMATION PROCESSING DEVICE, ELECTRONIC DEVICE, CONTROL METHOD OF INFORMATION PROCESSING DEVICE AND STORAGE MEDIUM

(71) Applicant: SHARP KABUSHIKI KAISHA, Sakai (JP)

(72) Inventors: Shinya Okuda, Sakai (JP); Akihiro Isoo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/340,641

(22) PCT Filed: Aug. 21, 2017

(86) PCT No.: PCT/JP2017/029781
§ 371 (c)(1),
(2) Date: Apr. 9, 2019

(87) PCT Pub. No.: WO2018/074047
PCT Pub. Date: Apr. 26, 2018

(65) Prior Publication Data
US 2020/0053653 A1 Feb. 13, 2020

(30) Foreign Application Priority Data
Oct. 18, 2016 (JP) .............................. 2016-204452

(51) Int. Cl.
*H04W 52/02* (2009.01)
*G06F 3/0346* (2013.01)

(52) U.S. Cl.
CPC ...... *H04W 52/0254* (2013.01); *G06F 3/0346* (2013.01)

(58) Field of Classification Search
CPC combination set(s) only.
See application file for complete search history.

(56) References Cited

U.S. PATENT DOCUMENTS 8,392,007 B1 * 3/2013 Izo .................... G06F 3/165
700/94
9,798,293 B1 * 10/2017 Roohani ............. G04G 13/021
(Continued)

FOREIGN PATENT DOCUMENTS

JP 2013-232816 A 11/2013

*Primary Examiner* — Yuwen Pan
*Assistant Examiner* — Erica L Fleming-Hall
(74) *Attorney, Agent, or Firm* — ScienBiziP, P.C.

(57) ABSTRACT

An embodiment of the present invention prevents false detection of lifting. An embodiment of the present invention includes: an angle determination section (62) configured to determine whether or not an angle of a longitudinal direction of a mobile terminal (1) with respect to a vertical direction is less than or equal to a predetermined value; and a lifting determination section (65) configured to determine whether or not the mobile terminal (1) has been lifted, the lifting determination section carrying out determination in (i) a case where the angle of the longitudinal direction of the electronic device with respect to the vertical direction is greater than the predetermined angle and (ii) a case where (a) the angle of the longitudinal direction of the electronic device with respect to the vertical direction is less than or equal to the predetermined angle and (b) an acceleration of the electronic device in the longitudinal direction satisfies a predetermined condition.

5 Claims, 7 Drawing Sheets

(56) References Cited

U.S. PATENT DOCUMENTS

| | | | |
|---|---|---|---|
| 2013/0060515 A1* | 3/2013 | Wei | G06F 1/3206 |
| | | | 702/141 |
| 2013/0321263 A1* | 12/2013 | Ho | G06F 3/03 |
| | | | 345/156 |
| 2017/0017855 A1* | 1/2017 | Karsh | G06T 7/20 |
| 2017/0354843 A1* | 12/2017 | Vuillerme | A61B 5/6898 |
| 2018/0132006 A1* | 5/2018 | Galant | G06F 3/017 |
| 2019/0286217 A1* | 9/2019 | da Veiga | G06F 1/3265 |
| 2019/0354252 A1* | 11/2019 | Badr | G06F 3/0484 |

* cited by examiner

INFORMATION PROCESSING DEVICE, ELECTRONIC DEVICE, CONTROL METHOD OF INFORMATION PROCESSING DEVICE AND STORAGE MEDIUM

TECHNICAL FIELD

The present invention relates to an information processing device, an electronic device, a method of controlling the information processing device, and a control program.

BACKGROUND ART

Recent mobile terminals (electronic devices) include various sensors and are becoming multifunctional. A typical example of such mobile terminals is smartphones. For example, Patent Literature 1 discloses a mobile terminal which includes an authenticating section and a posture detecting section. In a case where the authenticating section has succeeded in authenticating an object, the mobile terminal starts an application in accordance with a posture of a housing, which posture has been detected by the posture detecting section.

CITATION LIST

Patent Literature

[Patent Literature 1]
Japanese Patent Application Publication Tokukai No. 2013-232816 (Publication date: Nov. 14, 2013)

SUMMARY OF INVENTION

Technical Problem

The mobile terminal disclosed in Patent Literature 1 detects a state in which the mobile terminal is lifted (a posture of the mobile terminal), for example, on the basis of a result of detection by an acceleration sensor. However, the technique disclosed in Patent Literature 1 is not sufficient to prevent a false detection of lifting of the mobile terminal. Accordingly, it is highly likely that a false detection occurs. When a false detection occurs, some operation based on a result of detection by an acceleration sensor is carried out even though the user has not handled the mobile terminal. This results in a problem of an increased power consumption of a mobile terminal.

An embodiment of the present invention has been attained in view of the above problem. An object of the present invention is to provide an information processing device, an electronic device, a method of controlling the information processing device, and a control program, each of which makes it possible to prevent false detection of lifting, i.e., detection of lifting at a time not intended by the user.

Solution to Problem

In order to solve the above problem, an information processing device in accordance with an aspect of the present invention is an information processing device provided in an electronic device, the information processing device including: an angle determination section configured to determine whether or not an angle of a longitudinal direction of the electronic device with respect to a vertical direction is less than or equal to a predetermined value; and a lifting determination section configured to determine whether or not the electronic device has been lifted, the lifting determination section carrying out determination in (i) a case where the angle of the longitudinal direction of the electronic device with respect to the vertical direction is greater than the predetermined angle and (ii) a case where (a) the angle of the longitudinal direction of the electronic device with respect to the vertical direction is less than or equal to the predetermined angle and (b) an acceleration of the electronic device in the longitudinal direction satisfies a predetermined condition.

In order to solve the above problem, method of controlling an information processing device in accordance with an aspect of the present invention is a method of controlling an information processing device provided in an electronic device, including: an angle determination section and an angle determining step of determining whether or not an angle of a longitudinal direction of the electronic device with respect to a vertical direction is less than or equal to a predetermined value; and a lifting determination step of determining whether or not the electronic device has been lifted, the lifting determination being carried out in (i) a case where the angle of the longitudinal direction of the electronic device with respect to the vertical direction is greater than the predetermined angle and (ii) a case where (a) the angle of the longitudinal direction of the electronic device with respect to the vertical direction is less than or equal to the predetermined angle and (b) an acceleration of the electronic device in the longitudinal direction satisfies a predetermined condition.

Advantageous Effects of Invention

An aspect of the present invention makes it possible to stop lifting determination from being carried out in a case where the electronic device is positioned upright, unless acceleration of the electronic device in the upright direction (longitudinal direction) satisfies the predetermined condition. This makes it possible to reduce false detection of lifting in cases where the electronic device is positioned upright. Furthermore, because the decision of whether or not to carry out the lifting determination can be made with use of acceleration only, it is possible to make the electronic device lighter and more compact than in a configuration in which another sensor, such as a proximity sensor, is used.

Figure 5:
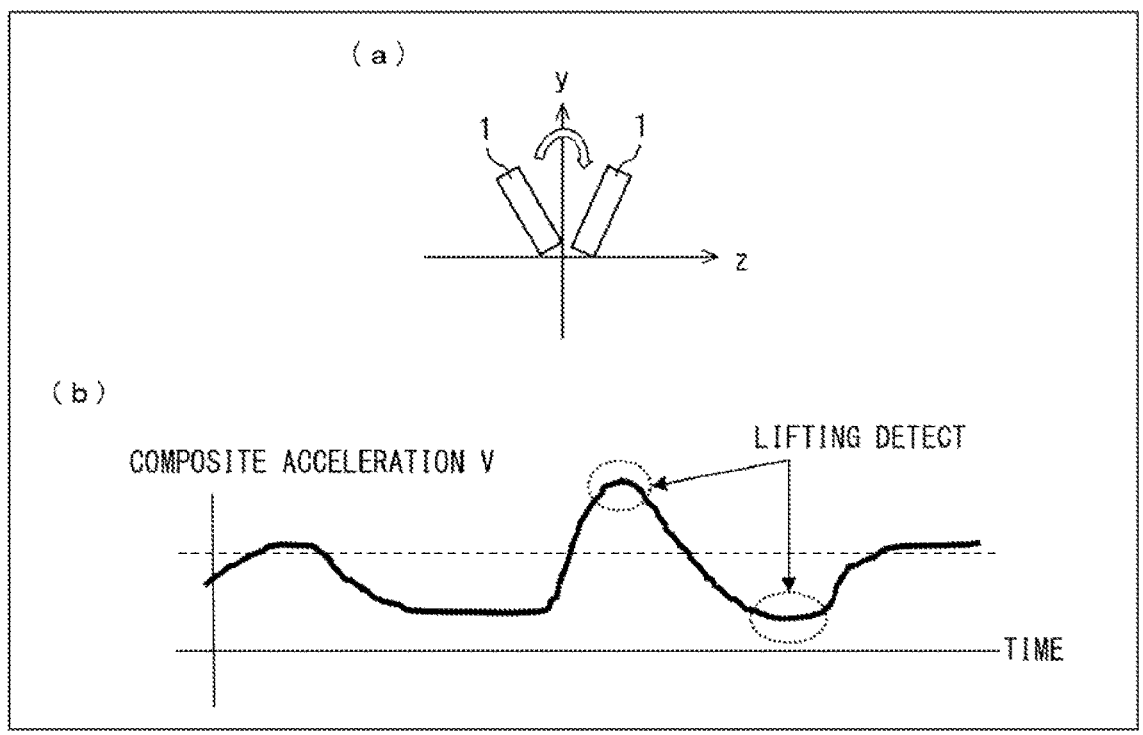

(a) and (b) of FIG. 5 are diagrams for explaining a possibility of a false detection.

Figure 6:
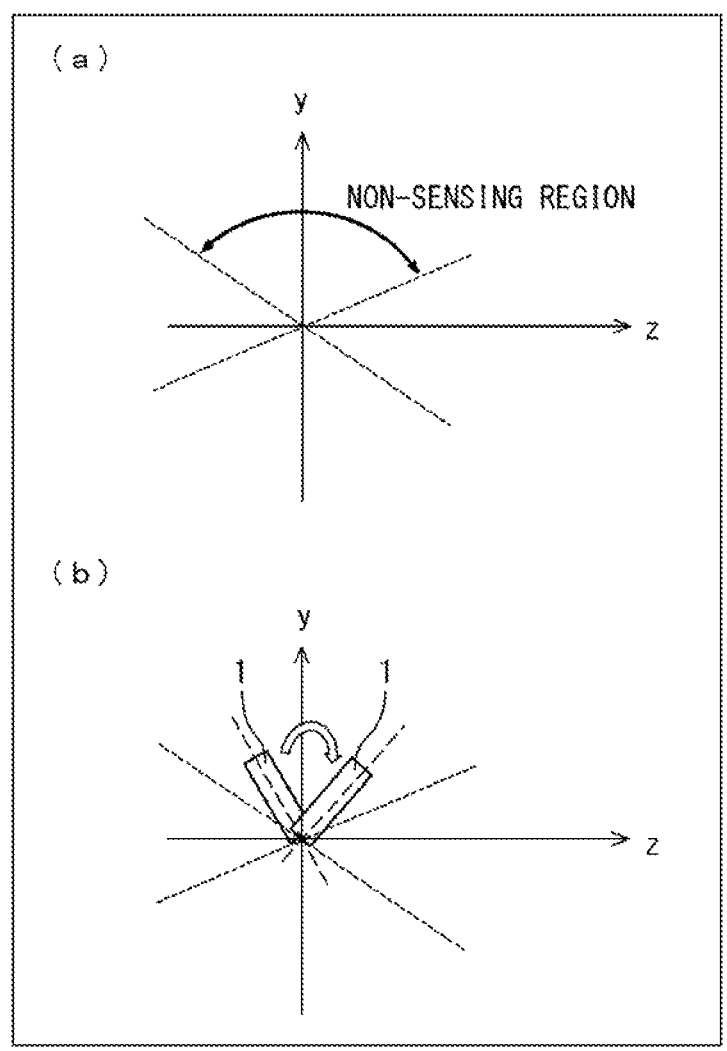

(a) and (b) of FIG. 6 are diagrams for explaining a method for preventing false detection.

Figure 7:
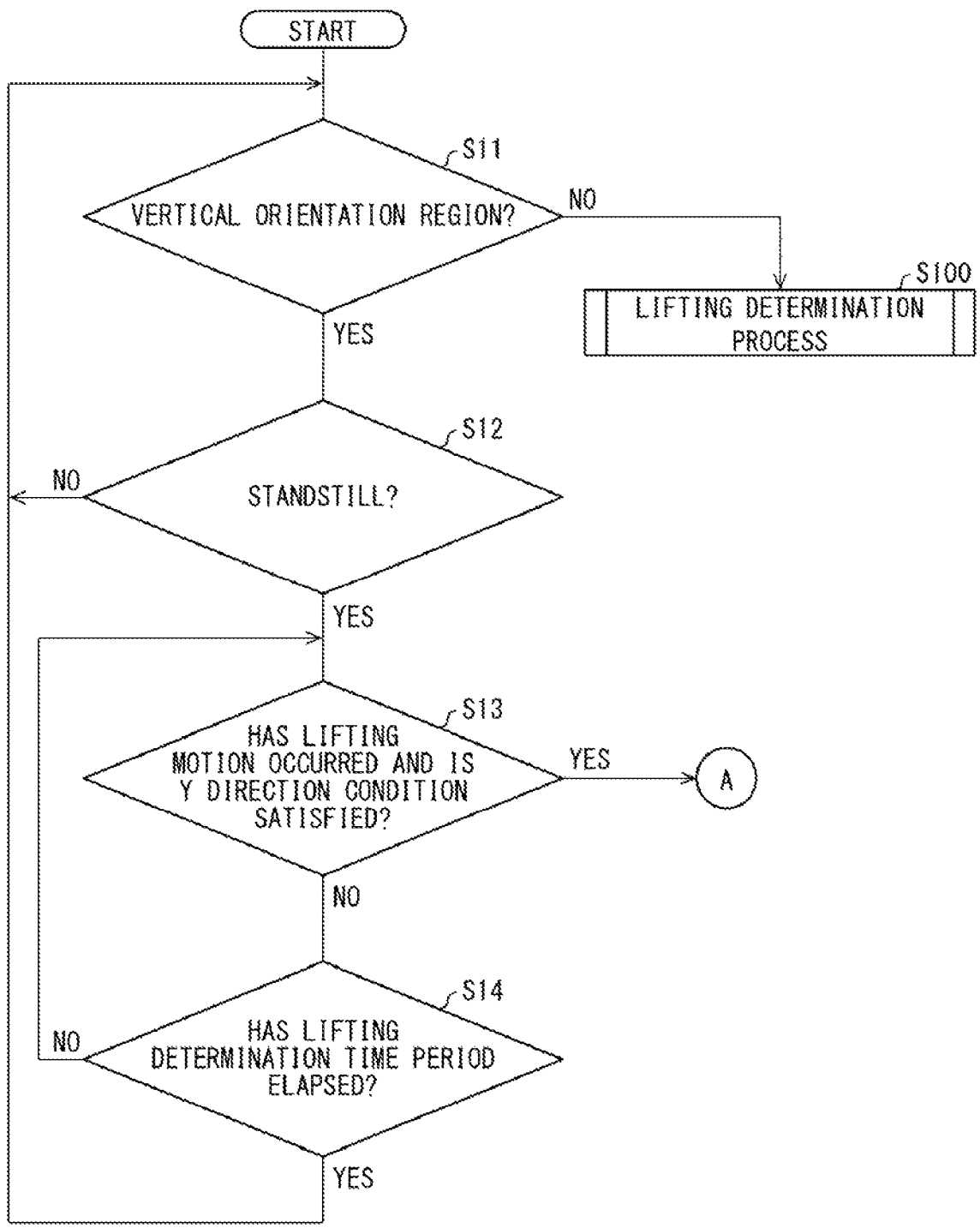

FIG. 7 is a flowchart illustrating a flow of a process in the mobile terminal.

Figure 8:
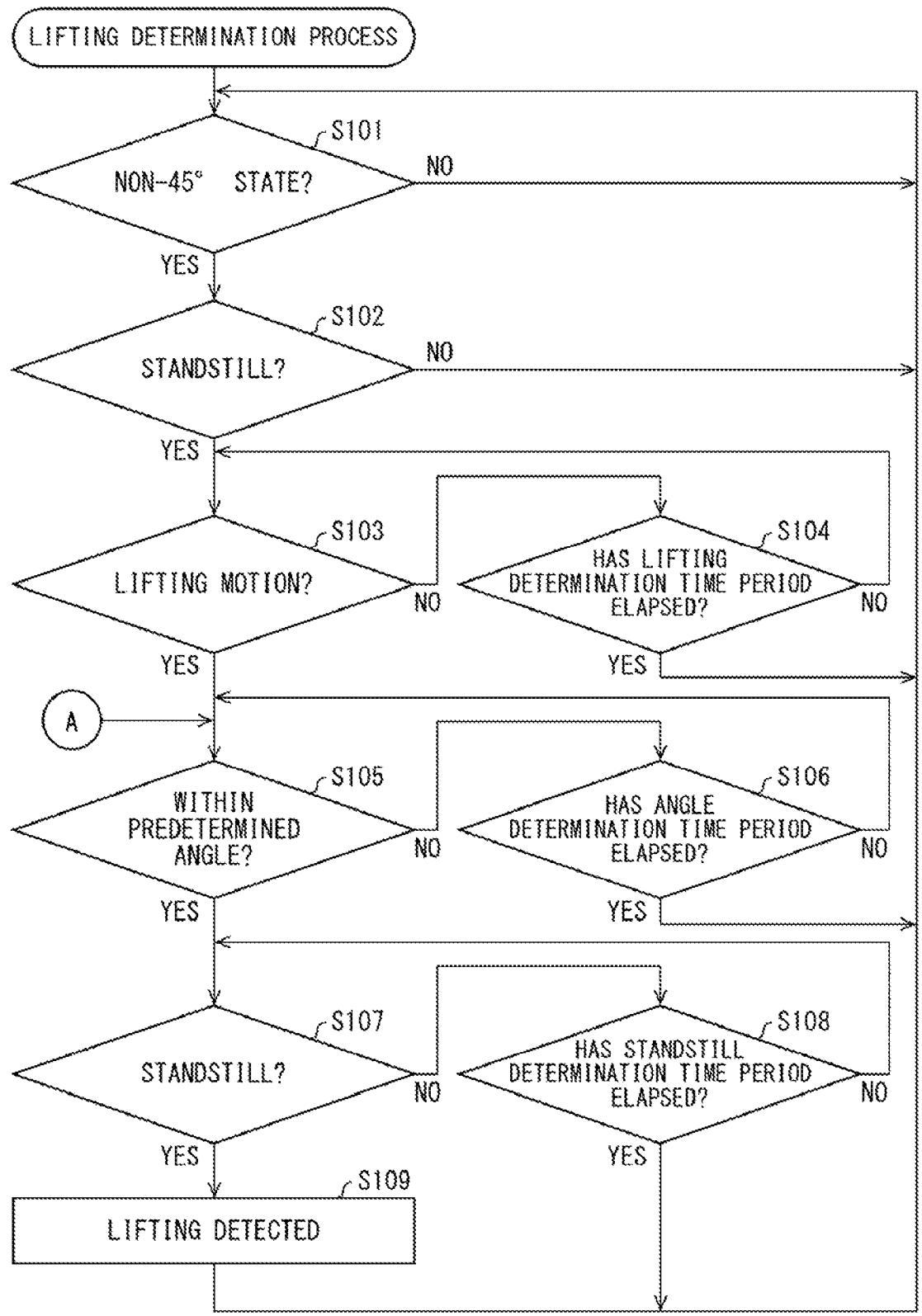

FIG. 8 is a flowchart illustrating a flow of a process in the mobile terminal.

Figure 9:
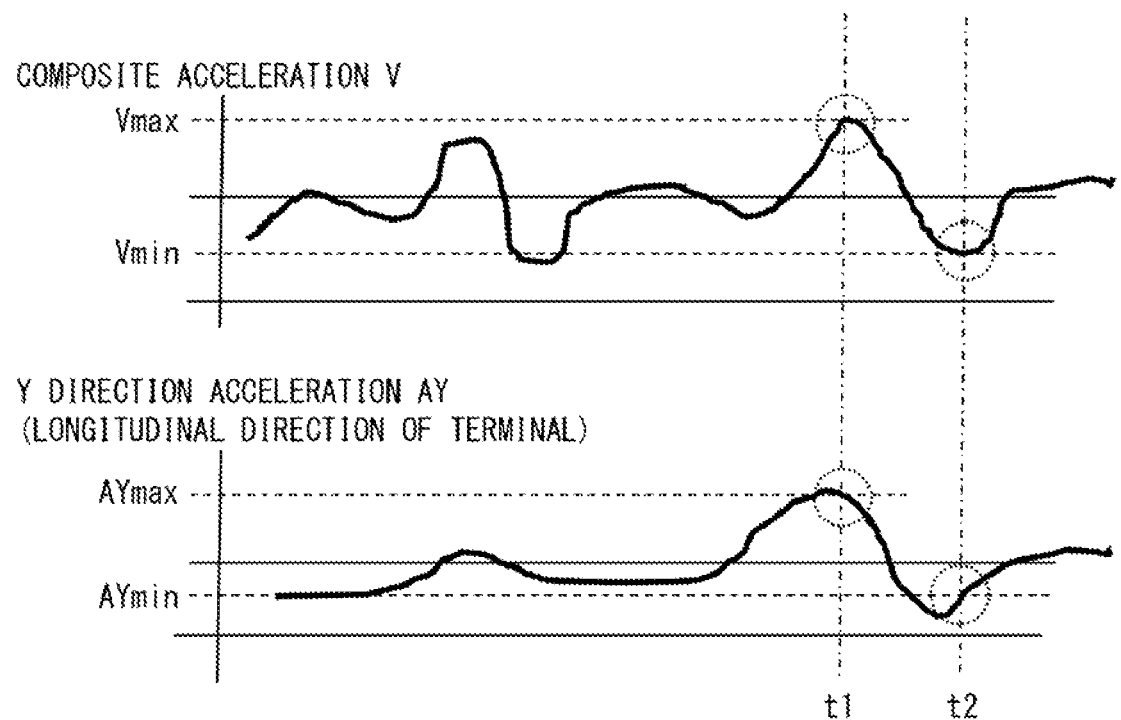

FIG. 9 indicates a relation between acceleration AY in the Y direction and a composite acceleration V.

DESCRIPTION OF EMBODIMENTS

Embodiment 1

(Overview of Mobile Terminal 1)

The following description will discuss details of Embodiment 1 of the present invention, with reference to FIGS. 1 to 6 and FIG. 9. A mobile terminal (electronic device) 1 in accordance with Embodiment 1 carries out various kinds of processing, for example, processing to turn on a touch panel, processing to power up the mobile terminal 1, and/or the like, on the basis of a result of lifting determination in which it is determined whether or not the mobile terminal 1 has been lifted. The mobile terminal 1 has a plurality of modes such as a normal mode, a horizontal mode in which lifting determination is carried out in a case where an initial state of the mobile terminal 1 is a horizontal state, and/or the like. Discussed in Embodiment 1 is an example of lifting determination in the normal mode.

Figure 2:
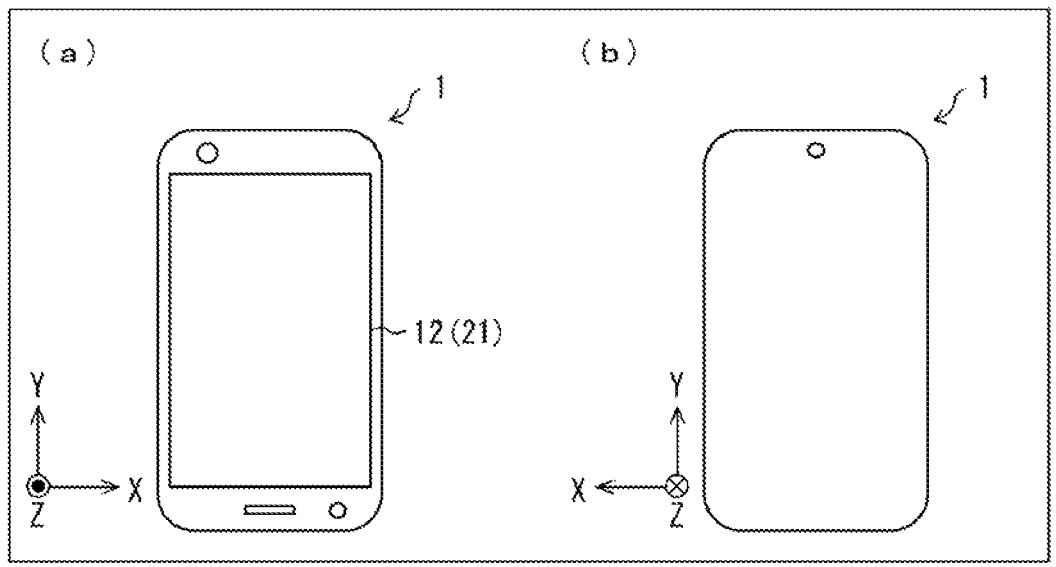
FIG. 2 is a view illustrating an appearance of the mobile terminal. (a) of FIG. 2 is a view illustrating a front side (i.e., touch panel side), and (b) of FIG. 2 is a view illustrating a back side (i.e., side facing away from the touch panel).

With reference to FIG. 2, discussed first is an appearance of the mobile terminal 1. FIG. 2 is a view illustrating an appearance of the mobile terminal 1. (a) of FIG. 2 is a view illustrating a front side (touch panel 12 side) of the mobile terminal 1, and (b) of FIG. 2 is a view illustrating a back side (a side facing away from a touch panel 12) of the mobile terminal 1.

As illustrated in FIG. 2, Embodiment 1 assumes that the mobile terminal 1 is a smartphone. However, the mobile terminal 1 is not limited to smartphones, and may be any portable electronic device or the like, such as a mobile phone, a portable information terminal, a portable television, or a portable personal computer.

(Hardware Configuration of Mobile Terminal 1)

Figure 3:
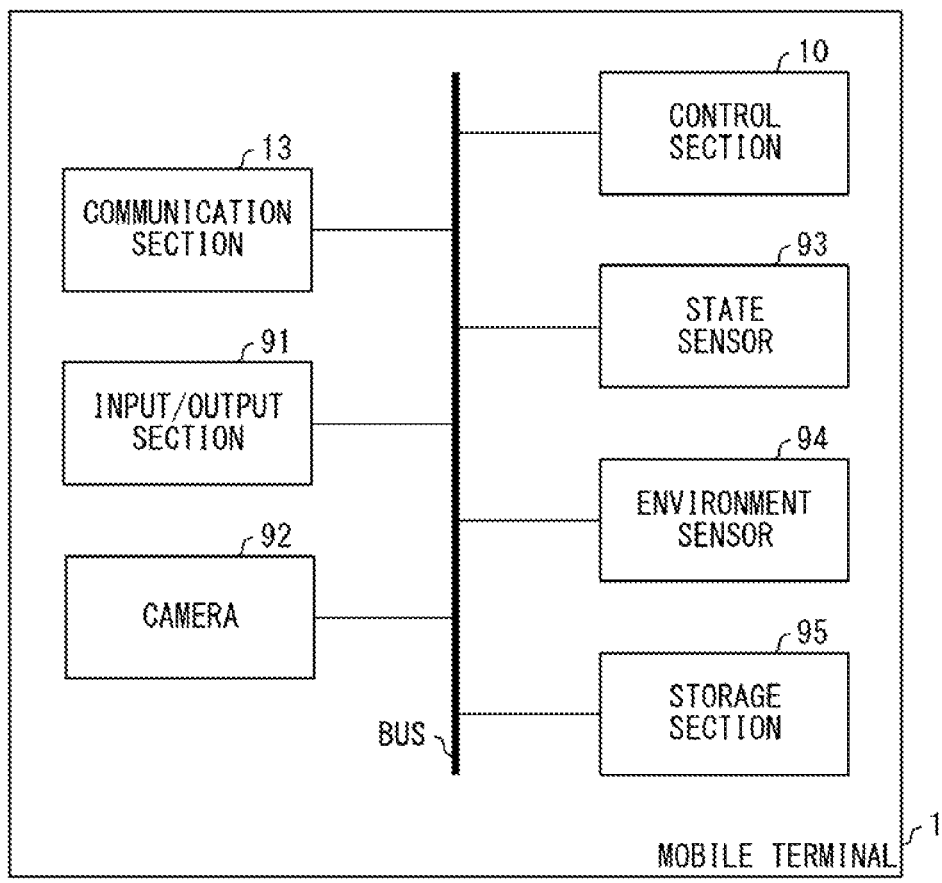
FIG. 3 is a view illustrating a typical hardware configuration of the mobile terminal.

Next, the following will discuss a hardware configuration of the mobile terminal 1, with reference to FIG. 3. FIG. 3 is a view illustrating a typical hardware configuration of the mobile terminal 1. As illustrated FIG. 3, the mobile terminal 1 includes a control section 10, a communication section 13, an input/output section 91, a camera 92, a state sensor 93, an environment sensor 94, and a storage section 95, each of which is connected to a system bus.

The control section 10 carries out overall control of the above sections of the mobile terminal 1. The function of the control section 10 may be realized by causing a central processing unit (CPU) to execute a program stored in the storage section 95. Further, the control section 10 carries out lifting determination for detecting whether or not the mobile terminal 1 has been lifted. Then, in a case where lifting is detected, the control section 10 executes a function associated with lifting.

The communication section 13 is a communication interface which is used when the mobile terminal 1 carries out communication (wired communication or wireless communication) with an external device. The storage section 95 stores various programs to be executed by the control section 10 and data to be used in the programs. The input/output section 91 receives an input operation carried out by a user. The input/output section 91 also serves as a member for presenting various kinds of information to the user. The input/output section 91 corresponds to the touch panel 12 (described later). The camera 92 captures a moving image in response to a command from the control section 10. The state sensor 93 detects various states of the mobile terminal 1. Examples of the state sensor 93 encompass not only an acceleration sensor 11 described below, but also a gyroscopic sensor, a geomagnetic sensor, an air pressure sensor, and/or the like. The environment sensor 94 detects circumstances around the mobile terminal 1. Examples of the environment sensor 94 include a proximity sensor, a brightness sensor (illuminance sensor), and the like. Note that the environment sensor 94 is not an essential component.

(Configuration of Main Parts of Mobile Terminal 1)

Figure 1:
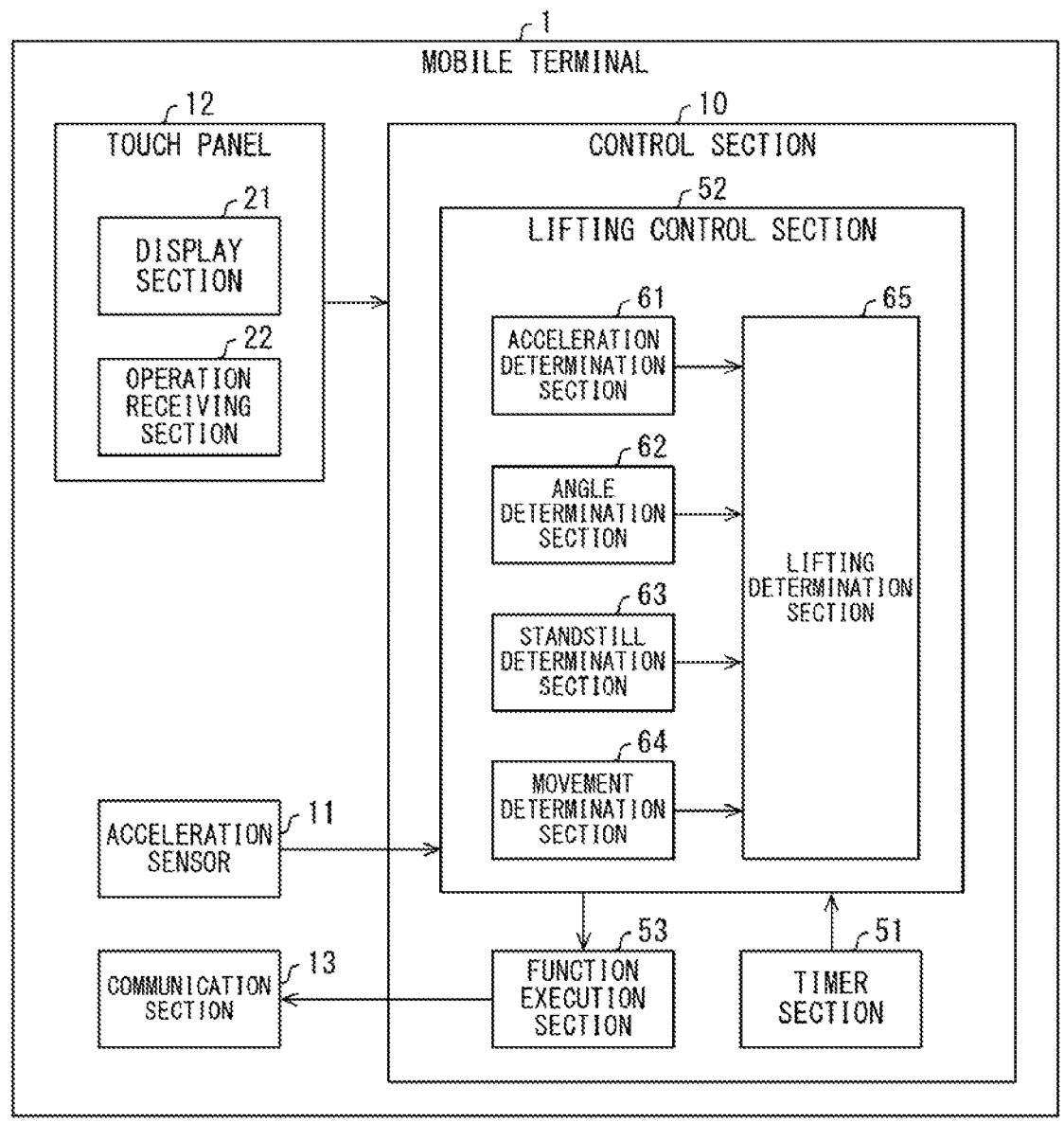
FIG. 1 is a block diagram illustrating a configuration of main parts of a mobile terminal.

Next, with reference to FIG. 1, the following description will discuss a configuration of main parts of the mobile terminal 1. FIG. 1 is a block diagram illustrating a main part configuration of the mobile terminal 1. As illustrated in FIG. 1, the mobile terminal 1 includes the control section 10, the acceleration sensor 11, the touch panel 12, and the communication section 13.

The acceleration sensor 11 detects acceleration in directions along three axes which are orthogonal to one another. It is assumed that (i) an X direction (X axis) is along a short-side direction of a display section (display surface) 21 of the touch panel 12, (ii) a Y direction (Y axis) is along a longitudinal direction of the display section 21, and (iii) a Z direction (Z axis) is along a direction from the back side to the front side of the display section 21 (see FIG. 2 described above).

The following provides an explanation using such an xyz orthogonal coordinate system. Hereinafter, respective accelerations in the X direction, the Y direction and the Z direction may be referred to as AX, AY and AZ. Moreover, the acceleration sensor 11 further detects a composite acceleration (hereinafter, referred to as V or composite acceleration V) obtained by combining the respective accelerations AX, AY, and AZ in the X, Y, and Z directions. The control section 10 is notified of a result of detection by the acceleration sensor 11. Note that the control section 10 can detect a horizontal plane (plane perpendicular to a direction of gravitational force), on the basis of the result of detection by the acceleration sensor 11.

The touch panel 12 not only displays information but also receives an operation which a user carries out on the mobile terminal 1. The touch panel 12 includes a display section 21 and an operation receiving section 22. The display section 21 displays various kinds of information. The operation receiving section 22 receives an operation carried out by a user when the user brings his/her finger etc. in contact with or in proximity to the operation receiving section 22. The touch panel 12 includes the display section 21 and the operation receiving section 22 in a manner such that the display section 21 and the operation receiving section 22 overlap positionally with each other and are integrated with each other.

The control section 10 includes a timer section 51, a lifting control section (information processing device) 52, and a function execution section 53.

The timer section 51 counts up time and notifies the lifting control section 52 of the time.

The lifting control section 52 determines whether or not the mobile terminal 1 has been lifted, on the basis of the accelerations detected by the acceleration sensor 11. Further, the lifting control section 52 includes an acceleration determination section 61, an angle determination section 62, a standstill determination section 63, a movement determination section 64, and a lifting determination section 65.

The acceleration determination section 61 determines whether or not a predetermined acceleration condition is satisfied, on the basis of an acceleration(s) detected by the acceleration sensor 11. For example, the acceleration determination section 61 determines whether or not the acceleration detected by the acceleration sensor 11 satisfies a predetermined lifting acceleration condition and a non-impact acceleration condition. Then, the acceleration determination section 61 notifies the lifting determination section 65 of a result of such determination.

In a case where the acceleration detected by the acceleration sensor 11 satisfies, for example, the following conditions (1) to (3), the acceleration determination section 61 determines that the lifting acceleration condition is satisfied (see FIG. 4 which will be described later). (1) A waveform showing a change in acceleration over time in a predetermined period has a maximum value and a minimum value. (2) The acceleration is higher than a threshold Th1 during a predetermined time period T1 including a time point (Ma) at which the acceleration is the maximum value. (3) The acceleration is lower than a threshold Th2 during a predetermined time period T2 including a time point (Mb) at which the acceleration is the minimum value. The above lifting acceleration condition is set in view of a change in acceleration over time as observed in a case where movement for lifting (lifting motion) of the mobile terminal 1 is made.

Further, in a case where the acceleration detected by the acceleration sensor 11 is within a predetermined non-impact reference range, the acceleration determination section 61 determines that the non-impact acceleration condition is satisfied.

The angle determination section 62 calculates an angle of the display section 21 with respect to the horizontal plane, on the basis of the acceleration detected by the acceleration sensor 11, and determines whether or not the angle of the mobile terminal 1 satisfies a predetermined angle condition (including an initial angle condition and a holding angle condition).

For example, the angle determination section 62 determines whether or not the angle of the mobile terminal 1 satisfies a predetermined initial angle condition (conditions for determining a non-45° state), on the basis of the acceleration detected by the acceleration sensor 11. Then, the angle determination section 62 notifies the lifting determination section 65 of a result of this determination.

Further, after the acceleration determination section 61 determines that the lifting acceleration condition and the non-impact acceleration condition are satisfied, the angle determination section 62 determines, with use of the acceleration detected by the acceleration sensor 11, whether or not the angle of the mobile terminal 1 satisfies a predetermined holding angle condition (whether or not the angle is within a predetermined holding angle reference range). The angle determination section 62 then notifies the lifting determination section 65 of a result of this determination. The predetermined holding angle reference range is, for example, a range of angles which the Y axis forms with respect to the horizontal plane, which range includes an angle of 45° (e.g., a range of not less than 15° and not more than 68°). The predetermined holding angle reference range may be understood, for example, as range of angles formed in a case where a user views the display section 21 after having lifted the mobile terminal 1. A state (posture) of the mobile terminal 1 in which the angle of the mobile terminal 1 is within the predetermined holding angle reference range may be referred to as "45° state". A state (posture) of the mobile terminal 1 in which the angle of the mobile terminal 1 falls outside the predetermined holding angle reference range may be referred to as "non-45° state".

The angle determination section 62 also determines whether or not the posture of the mobile terminal 1 is included in a vertical orientation region (determination of vertical orientation condition). The angle determination section 62 then notifies the lifting determination section 65 of a result of this determination. For example, the angle determination section 62 determines whether or not the vertical orientation condition is satisfied by determining whether or not the angle of the Y direction of the mobile terminal 1 is less than or equal to 53° (AY>0.8 g, where g represents gravitational acceleration). In other words, the angle determination section 62 determines whether or not an angle of a longitudinal direction of the mobile terminal 1 with respect to a vertical direction is less than or equal to a predetermined value.

The standstill determination section 63 determines whether or not the mobile terminal 1 is in a predetermined standstill state, on the basis of the acceleration detected by the acceleration sensor 11.

For example, the standstill determination section 63 determines whether or not the state of the mobile terminal 1 satisfies a predetermined initial standstill condition, with use of the acceleration detected by the acceleration sensor 11. Then, the standstill determination section 63 notifies the lifting determination section 65 of a result of this determination.

Further, after the angle determination section 62 determines that the holding angle condition is satisfied, the standstill determination section 63 determines, with use of the acceleration detected by the acceleration sensor 11, whether or not the mobile terminal 1 is in a standstill state (whether or not the mobile terminal 1 satisfies the standstill condition) while the mobile terminal 1 continues to satisfy the holding angle condition. The standstill determination section 63 then notifies the lifting determination section 65 of a result of this determination.

Further, after the angle determination section 62 determines that the vertical orientation condition is satisfied, the standstill determination section 63 determines, with use of the acceleration detected by the acceleration sensor 11, whether or not the mobile terminal 1 is in a standstill state while the mobile terminal 1 continues to satisfy the vertical orientation condition (whether or not the mobile terminal 1 satisfies a vertical orientation standstill condition). The standstill determination section 63 then notifies the lifting determination section 65 of a result of this determination.

The movement determination section 64 determines whether or not there has been movement of mobile terminal 1 in the Y direction, on the basis of the acceleration detected by the acceleration sensor 11. Specifically, the movement determination section 64 determines that there has been movement in the Y direction in a case where a value of acceleration AY in the Y direction is approximately equivalent to the composite acceleration V. For example, the movement determination section 64 determines that there has been movement in the Y direction in a case where AY>V×0.5 is satisfied. FIG. 9 indicates a relation between the acceleration AY in the Y direction and the composite acceleration V. As illustrated in FIG. 9, the movement determination section 64 determines that there has been movement in the Y direction in a case where AY>V×0.5 is satisfied at a certain time point (for example, t1 or t2) Note that the value 0.5 by which the composite acceleration V is multiplied is merely an example. This value can be set, as a parameter value, within a range of approximately 0.3 to approximately 1.0. This makes it possible to adjust sensitivity.

The lifting determination section 65 determines whether or not the mobile terminal 1 has been lifted, on the basis of the above results of determination from the acceleration determination section 61, the angle determination section 62, the standstill determination section 63, and the movement determination section 64. Then, the lifting determination section 65 notifies the function execution section 53 of a result of this determination. Note that the details of a process carried out in the lifting control section 52 will be discussed below.

In a case where the lifting determination section 65 determines that the mobile terminal 1 has been lifted, the function execution section 53 executes a corresponding function. The corresponding function may be any function associated with lifting of the mobile terminal 1, for example, a function to turn on display of the display section 21 (make display of the display section 21 bright), a function to turn on the mobile terminal 1, a function to start communicating with another device, and/or the like.

(Details of Processing in Lifting Control Section 52)

Figure 4:
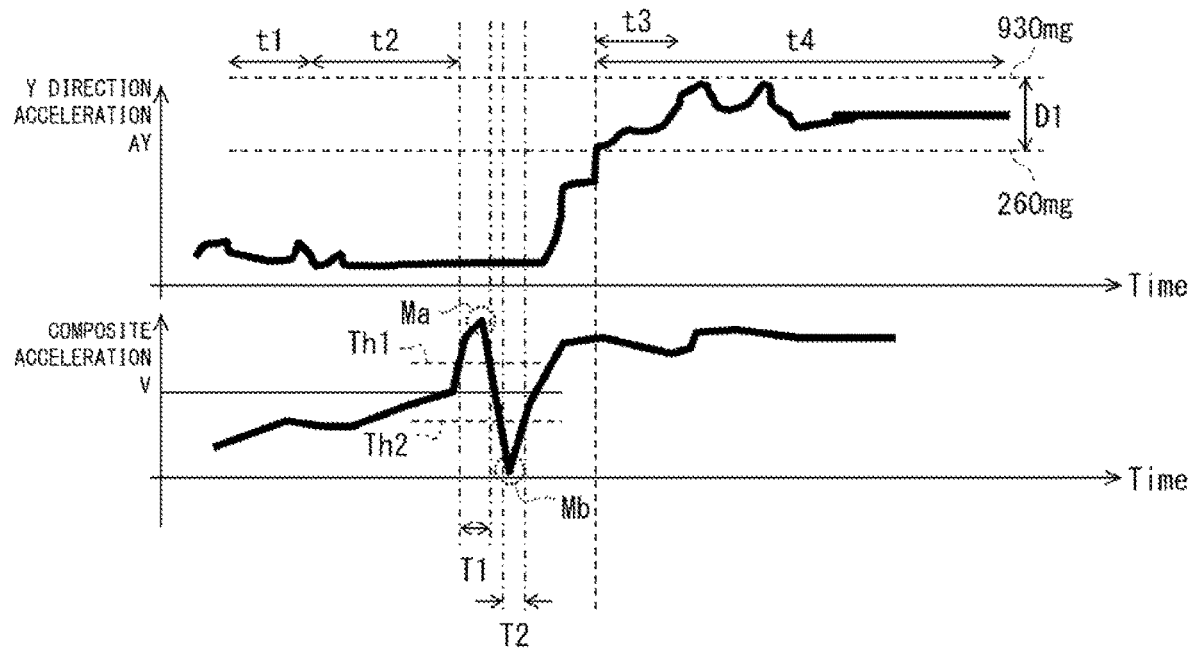
FIG. 4 is a diagram for explaining principles of lifting detection.

Next, the following will discuss the details of processing in the lifting control section 52, with reference to FIGS. 4 to 6. FIG. 4 is a diagram for explaining principles of lifting detection. FIG. 5 consists of diagrams for explaining a possibility of a false detection. FIG. 6 consists of diagrams for explaining a method for preventing false detection. Note that numerical values below are merely examples, and such numerical values may be changed as appropriate in accordance with specifications etc. of the mobile terminal 1.

First, as illustrated in FIG. 4, the angle determination section 62 determines whether or not the mobile terminal 1 satisfies the predetermined initial angle condition. Specifically, the angle determination section 62 determines that the initial angle condition is satisfied and the mobile terminal 1 is in the non-45° state, in a case where the accelerations satisfy the following angle conditions (4) and (5) for a predetermined time period (t1 in FIG. 4; e.g., 300 ms (milliseconds)). Note here that g represents a gravitational acceleration. (4) AX<−400 mg (milli g) or AX>400 mg. (5) AY<260 mg or AY>930 mg (that is, AY is outside a range of D1 in FIG. 4). Note that there is no particular condition set for AZ.

Next, the standstill determination section 63 determines whether or not the mobile terminal 1 satisfies the predetermined initial standstill condition. Specifically, the standstill determination section 63 calculates a deviation (standard deviation) of each of the accelerations. The deviation is, for example, a deviation from an average value of the acceleration per unit time (e.g., 500 ms (milliseconds)). Specifically, the standstill determination section 63 determines that the initial standstill condition is satisfied in a case where, while the initial angle condition remains satisfied, the calculated deviation (standard deviation) of each of the accelerations satisfies the following condition (6) for a predetermined time period (t2 in FIG. 4; e.g., 1 s (second)). (6) Deviation (standard deviation) of each of accelerations AX, AY, and AZ ≤ 100 mg (initial standstill reference range).

For example, in a case where the mobile terminal 1 is carried in a bag or the like, a change in posture of the mobile terminal 1 may occur due to continuous oscillations caused by walking etc. In such a case, motion which causes a change in posture can potentially result in a false detection in which it is determined that the mobile terminal 1 has been lifted. In order to prevent such a false detection, the standstill determination section 63 determines whether or not the mobile terminal 1 satisfies an initial standstill condition. This makes it possible to reduce the possibility that the above-described false detection will occur in a case where a change in posture of the mobile terminal 1 occurs due to continuous oscillations caused by walking etc. This is because, in such a case, the initial standstill condition is not satisfied, since the deviation of the acceleration is outside the predetermined initial standstill reference range (in Embodiment 1, the predetermined initial standstill reference range of the deviation (standard deviation) of each of the accelerations in AX, AY, and AZ is not more than 100 mg). It is therefore possible to reduce power consumption caused by the false detection in the mobile terminal 1.

Next, the acceleration determination section 61 determines whether or not the acceleration detected by the acceleration sensor 11 satisfies the predetermined lifting acceleration condition. Specifically, the acceleration determination section 61 determines that the above conditions (1) to (3) of the lifting acceleration condition are satisfied in a case where the following expressions (A) to (C) are satisfied:

$$V(M) \leq 1150 \text{ mg, and } \min(V(M+1), V(M+2)) > 1150 \text{ mg} \quad \text{(A)};$$

$$V(N) < 850 \text{ mg, and } \min(V(N+1), V(N+2)) \geq 850 \text{ mg} \quad \text{(B); and}$$

$$180 \text{ ms} \leq Tb - Ta \leq 1500 \text{ ms} \quad \text{(C)}.$$

In the above expressions, V(M) represents a composite acceleration V at a time point M and V(N) represents a composite acceleration V at a time point N. Note that M and N are each an integer of not less than 0. Further, Ta represents a time point of V(M+2) and Tb represent a time point of V(N+2). M+1 indicates a time point following the time point M (e.g., 50 ms after the time point M). M+2 indicates a time point following the time point M+1 (e.g., 50 ms after the time point M+1) (the same applies to N). The expressions (A) and (B) are determination conditions for detecting the maximum value and the minimum value of V, respectively. The expression (C) is a determination condition which is set in view of a manner of change (transition from the maximum value to the minimum value) in V over time.

Further, the acceleration determination section 61 determines whether or not the acceleration detected by the acceleration sensor 11 satisfies a predetermined non-impact acceleration condition as well as the lifting acceleration condition. Specifically, the acceleration determination section 61 determines that the non-impact acceleration condition is satisfied in a case where the acceleration(s) satisfies/satisfy the following condition (7). (7) AX, AY, AZ (or composite acceleration V)<1500 mg (non-impact reference range).

When a lifting motion of the mobile terminal 1 is detected by the acceleration sensor 11, there is a possibility of a false detection of lifting. For example, there is the possibility that it could be determined that the mobile terminal 1 has been lifted even in a case where the acceleration of the lifting motion detected by the acceleration sensor 11 is caused by an impact due to a fall or the like of the mobile terminal 1. In order to prevent such a false detection, the acceleration determination section 61 determines whether or not the acceleration detected by the acceleration sensor 11 satisfies the non-impact acceleration condition as well as the above lifting acceleration condition. This makes it possible to reduce the possibility that the above-described false detection will occur in a case where the acceleration detected by the acceleration sensor 11 is an acceleration caused by a strong impact due to a fall or the like of the mobile terminal 1. This is because, in such a case, the non-impact acceleration condition is not satisfied, since the acceleration is outside the predetermined non-impact reference range (in Embodiment 1, each of AX, AY, and AZ is less than 1500 mg or the composite acceleration V is less than 1500 mg). It is therefore possible to reduce power consumption caused by the false detection in the mobile terminal 1.

Next, the angle determination section 62 determines whether or not the mobile terminal 1 satisfies the predetermined holding angle condition. Specifically, the angle determination section 62 determines that the mobile terminal 1 is in the 45° state and satisfies the holding angle condition, in a case where the accelerations satisfy the following angle conditions (8) to (10) (conditions for determining a 45° state) for a predetermined time period (e.g., 210 ms=30 ms×7): (8)−400 mg≤AX s 400 mg; (9) 260 mg≤AY≤930 mg (that is, AY is within the range of D1 in FIG. 4); and (10) AZ>0 (where a positive direction of the Z axis corresponds to a direction from the back side to the front side of the mobile terminal 1).

Note that the condition (8) corresponds to a state in which an angle of the X axis with respect to the horizontal plane is within ±25° (and the above condition (4) corresponds to a state in which an angle of the X axis with respect to the horizontal plane is not within ±25°). Note also that the condition (9) corresponds to a state in which an angle of the Y axis with respect to the horizontal plane is within a predetermined angle range (not less than 15° and not more than 68°) (and the above condition (5) corresponds to a state in which an angle of the Y axis with respect to the horizontal plane is not within the predetermined range). Further, the determination of whether the conditions (8) to (10) are satisfied is carried out a plurality of times (e.g., 7 times) at predetermined intervals (e.g., every 30 ms). Then, when the conditions (8) to (10) are satisfied in all the plurality of times of determination, it is determined that the mobile terminal 1 is in the 45° state.

Next, the standstill determination section 63 determines whether or not the mobile terminal 1 satisfies the predetermined standstill condition. Specifically, the standstill determination section 63 determines that the mobile terminal 1 satisfies the standstill condition in a case where the accelerations satisfy the following conditions (11) and (12). (11) For acceleration in each of the directions (i.e., AX, AY, and AZ), deviation (standard deviation) in a respective set of acceleration values is within 40 mg (standstill reference range), where each of the respective sets of acceleration values consists of a plurality of values successively obtained from the acceleration sensor 11 for 210 ms at intervals of 30 ms, the deviation calculation excluding the minimum and maximum values in each set. (12) For acceleration in each of the directions (i.e., AX, AY, and AZ), deviation (standard deviation) in a respective set of acceleration values is in a range of not less than 15 mg and not more than 40 mg (incomplete standstill reference range)(which range excludes a range of not less than 0 mg and less than 15 mg (complete standstill reference range)), where each of the respective sets of acceleration values consists of the plurality of values successively obtained from the acceleration sensor 11 for the 210 ms.

For example, in a case where a user takes the mobile terminal 1 in his/her hand but then immediately puts the mobile terminal 1 on a target object without operating the mobile terminal 1, a false detection may occur in which it is determined that the mobile terminal 1 has been lifted. In order to prevent such a false detection, the standstill determination section 63 determines that the standstill condition is satisfied in a case where the deviation (standard deviation) of each of the accelerations detected by the acceleration sensor 11 is in the incomplete standstill reference range (not less than 15 mg and not more than 40 mg) which excludes the complete standstill reference range (not less than 0 mg and less than 15 mg). With this configuration, in a case where the mobile terminal 1 is put on a target object, the mobile terminal 1 does not satisfy the standstill condition because the mobile terminal 1 is in a substantially complete standstill state (within a complete standstill reference range). This makes it possible to reduce the possibility that the above-described false detection will occur. It is therefore possible to reduce power consumption caused by the false detection in the mobile terminal 1.

The standstill determination section 63 may commence determination (of whether or not the standstill condition of the mobile terminal 1 is satisfied) once a predetermined time period (t3 in FIG. 4; e.g., 120 ms) has elapsed after a time point at which the above-described predetermined holding angle condition was satisfied. This makes it possible to determine whether or not the standstill condition is satisfied in a time period which excludes a period in which the state (posture) of the mobile terminal 1 is unstable. In a case where the standstill condition is not satisfied even after a predetermined time (t4 in FIG. 4, e.g., 3.3 s) has elapsed after a time point at which the standstill determination section 63 started determining whether or not the standstill condition is satisfied, the standstill determination section 63 ends the determination of whether or not the standstill condition is satisfied (i.e., the standstill determination times out).

The above processing makes it possible to determine whether or not the mobile terminal 1 has been lifted. However, in a case where (i) the mobile terminal 1 is placed in a bag, a pocket, or other some such space that allows a certain degree of free movement and (ii) the mobile terminal 1 is in the 45° state (i.e., AY is within the range D1 shown in FIG. 4), frontward and backward movement of the mobile terminal 1 (i.e., movement along the Z direction) could potentially result in a determination that the mobile terminal 1 has been lifted, even if the user has not lifted actually lifted the mobile terminal 1.

This is discussed with reference to FIG. 5. In a case where the mobile terminal 1 is in the 45° state and moves frontward and/or backward as illustrated in (a) of FIG. 5, then it is possible that, as illustrated in (b) of FIG. 5, the composite acceleration V satisfies the lifting acceleration condition and, concurrently, the above-described conditions for determining a 45° state are satisfied. In such a case, it may be determined that the mobile terminal 1 has been lifted even though it has not actually been lifted.

In order to address this, in Embodiment 1, the method of determining whether or not lifting has occurred differs in accordance with the posture of the mobile terminal 1 at the time of commencement of the determination. Specifically, as illustrated in (a) of FIG. 6, a non-sensing region is provided. The method of determining whether or not lifting has occurred differs in accordance with whether the posture of the mobile terminal 1 is included (see (b) of FIG. 6) or is not included in the non-sensing region at the time of commencement of determination of whether or not lifting has occurred.

In a case where the posture of the mobile terminal 1 is not included in the non-sensing region at the time of commencement of lifting determination, the lifting determination section 65 carries out lifting determination in the manner described above. That is, when the "initial angle condition (conditions for determining a non-45° state)", the "initial standstill", the "acceleration condition", the "holding angle condition (conditions for determining a 45° state)" and the "standstill condition" are satisfied in this order, the lifting determination section 65 determines that the mobile terminal 1 has been lifted (lifting of the mobile terminal 1 is detected).

However, in a case where the posture of the mobile terminal 1 is included in the non-sensing region (vertical orientation region) at the time of commencement of determination, the lifting determination section 65 carries out processing as follows. Specifically, in a case where (i) the "acceleration condition" has been satisfied and (ii) and a change in acceleration along the longitudinal axis of the terminal satisfies a condition (vertical direction lifting determination condition), the lifting determination section 65 determines that the mobile terminal 1 has been lifted after determining subsequent processes (i.e., a "holding angle condition (conditions for determining a 45° state)", followed by the "standstill condition").

With this configuration, in a case where the posture of the mobile terminal 1 is included in the non-sensing region at the time of commencement of determination, it will not be determined that lifting has occurred unless a Y direction condition is satisfied. As such, it is possible to prevent a false detection of lifting even in the case illustrated in FIG. 5.

One possible example of the non-sensing region is a region where the angle of the Y direction is less than or equal to 53° (a vertical orientation condition, AY>0.8 g). The angles included in this region are similar to angles that satisfy the conditions for determining a 45° state. As such, by using a different method of lifting determination for cases when the posture of the mobile terminal 1 is included in the non-sensing region, it is possible to decrease the likelihood of a false detection.

Further, the lifting control section 52 may carry out a next lifting determination once a predetermined time period has elapsed after an immediately preceding lifting determination.

(Flow of Process in Mobile Terminal 1)

Next, with reference to FIGS. 7 and 8, the following description will discuss a flow of a process of lifting detection carried out in the mobile terminal 1. FIGS. 7 and 8 are each a flowchart illustrating a flow of a process of lifting detection in the mobile terminal 1.

As illustrated in FIG. 7, first, based on the results of determination by the angle determination section 62, the lifting determination section 65 determines whether or not the posture of the mobile terminal 1 is included in the vertical orientation region, i.e., the lifting determination section 65 determines whether or not the vertical orientation condition has been satisfied (S11, angle determination step). In a case where the posture of the mobile terminal 1 is not included in the vertical orientation region ("NO" in S11), the process proceeds to step S100, so that a lifting determination process (lifting determination step) is carried out. Details of the lifting determination process will be described later.

In contrast, in a case where the posture of the mobile terminal 1 is included in the vertical orientation region ("YES" in S11), the standstill determination section 63 determines whether or not the vertical orientation standstill condition is satisfied (S12). In a case where the vertical orientation standstill condition is satisfied ("YES" in S12), the acceleration determination section 61 determines whether or not the lifting acceleration condition and the non-impact acceleration condition are satisfied. Furthermore, the movement determination section 64 determines whether or not there has been movement in the Y direction (longitudinal direction of the terminal), i.e., whether or not the vertical direction lifting determination condition is satisfied (S13). Then, in a case where (i) both the lifting acceleration condition and the non-impact acceleration condition are satisfied and (ii) there has been movement in the Y direction ("YES" in S13), the process proceeds to step S105 of the lifting determination process (described later).

In a case where either (i) the lifting acceleration condition or the non-impact acceleration condition has not been satisfied, or (ii) there has been no lifting in the Y direction, the process returns to step S11 after a lifting determination time period has elapsed ("YES" in S14).

(Lifting Determination Process)

Next, with reference to FIG. 8, the following description will discuss a flow of a process for lifting determination. First, the angle determination section 62 determines whether or not the initial angle condition (conditions for determining a non-45° state) is satisfied (S101). In a case where the initial angle condition is satisfied ("YES" in S101), the standstill determination section 63 determines whether or not the initial standstill condition is satisfied (S102). In a case where the initial standstill condition is satisfied ("YES" in S102), the acceleration determination section 61 determines whether or not the lifting acceleration condition and the non-impact acceleration condition are satisfied (S103). In a case where the lifting acceleration condition and the non-impact acceleration condition are satisfied ("YES" in S103), the angle determination section 62 determines whether or not the holding angle condition (conditions for determining a 45° state) is satisfied (S105). In a case where the holding angle condition is satisfied ("YES" in S105), the standstill determination section 63 determines whether or not the standstill condition is satisfied (S107). In a case where the standstill condition is satisfied, the lifting determination section 65 determines that the mobile terminal 1 has been lifted (S109).

In contrast, in a case where the initial angle condition (conditions for determining a non-45° state) is not satisfied in S101 ("NO" in S101), the process goes back to S101. Further, in a case where the initial standstill condition is not satisfied in S102 (NO in S102), the process goes back to S101. In a case where the lifting acceleration condition or the non-impact acceleration condition is not satisfied in S103 ("NO" in S103), the process goes back to S101 after a predetermined time period (lifting determination time period) has elapsed ("YES" in S104). In a case where the holding angle condition (conditions for determining a 45° state) is not satisfied in S105 ("NO" in S105), the process goes back to S101 after a predetermined time period (angle determination time period) has elapsed ("YES" in S106). In a case where the standstill condition is not satisfied in S107 ("NO" in S107), the process goes back to S101 after a predetermined time period (standstill determination time period) has elapsed ("YES" in S107).

In this way, in Embodiment 1, the determination of whether or not the mobile terminal 1 has been lifted is carried out in (i) a case where an angle of a longitudinal direction of the mobile terminal 1 with respect to a vertical direction is greater than predetermined value and (ii) a case where (a) the angle of the longitudinal direction of the mobile terminal 1 with respect to the vertical direction is less than or equal to the predetermined value and (b) an acceleration of the electronic device in the longitudinal direction satisfies the vertical direction lifting determination condition (a predetermined condition).

Embodiment 2

The mobile terminal 1 may have a horizontal mode in which the lifting determination is carried out in a case where an initial state of the mobile terminal 1 is a substantially horizontal state.

In the horizontal mode, the angle determination section 62 determines, based on acceleration, whether or not the mobile terminal 1 is in a horizontal state. When movement occurs that changes the state of the mobile terminal 1 from the horizontal state, lifting detection is carried out similarly to the manner in Embodiment 1, by determining whether the holding angle condition (conditions for determining a 45° state) and the standstill condition are satisfied.

As described above, in the horizontal mode, the lifting determination is carried out in a case where an initial state of the mobile terminal 1 is a substantially horizontal state. In a case where the state of the mobile terminal 1 changes from (i) the state in which the mobile terminal 1 is substantially parallel to a horizontal plane to (ii) a different state, it is highly likely that the mobile terminal 1 has been lifted. In the horizontal mode, it is possible to determine whether or not the mobile terminal 1 has been lifted, by carrying out lifting determination only in a case where an angle of the mobile terminal 1 changes from (i) a state in which the mobile terminal 1 is substantially parallel to the horizontal plane to (ii) a different angle.

Embodiment 31 (Software Implementation Example)

Control blocks of the mobile terminal 1 (in particular, the control section 10 (the timer section 51, the lifting control section 52 (the acceleration determination section 61, the angle determination section 62, the standstill determination section 63, the movement determination section 64, and the lifting determination section 65), and the function execution section 53)) can be realized by a logic circuit (hardware) provided in an integrated circuit (IC chip) or the like or can be alternatively realized by software as executed by a central processing unit (CPU).

In the latter case, the mobile terminal 1 includes: a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

RECAP

An information processing device (control section 10) in accordance with Aspect 1 of the present invention is an information processing device provided in an electronic device, the information processing device including: an angle determination section (62) configured to determine whether or not an angle of a longitudinal direction of the electronic device with respect to a vertical direction is less than or equal to a predetermined value; and a lifting determination section (65) configured to determine whether or not the electronic device has been lifted, the lifting determination section carrying out determination in (i) a case where the angle of the longitudinal direction of the electronic device with respect to the vertical direction is greater than the predetermined angle and (ii) a case where (a) the angle of the longitudinal direction of the electronic device with respect to the vertical direction is less than or equal to the predetermined angle and (b) an acceleration of the electronic device in the longitudinal direction satisfies a predetermined condition.

With the above configuration, determination of whether or not the electronic device has been lifted is carried out in (i) a case where the angle of the longitudinal direction of the electronic device with respect to the vertical direction is not greater than the predetermined angle and (ii) a case where (a) the angle of the longitudinal direction of the electronic device with respect to the vertical direction is less than or equal to the predetermined angle and (b) an acceleration of the electronic device in the longitudinal direction satisfies a predetermined condition. Put otherwise, the lifting determination is not carried out in a case where (i) the angle of the longitudinal direction of the electronic device with respect to the vertical direction is less than the predetermined value and (ii) the acceleration of the electronic device in the longitudinal direction does not satisfy the predetermined condition. A case where the angle of the longitudinal direction of the electronic device with respect to the vertical direction is less than the predetermined value is a case where the longitudinal direction of the electronic device is in a nearly perpendicular state, i.e., a case where the electronic device is positioned upright.

It is therefore possible to stop lifting determination from being carried out in a case where the electronic device is positioned upright, unless acceleration of the electronic device in the upright direction (longitudinal direction) satisfies the predetermined condition. This makes it possible to reduce false detection of lifting in cases where the electronic device is positioned upright.

Furthermore, because the decision of whether or not to carry out the lifting determination can be made with use of acceleration only, it is possible to make the electronic device lighter and more compact than in a configuration in which another sensor, such as a proximity sensor, is used.

In Aspect 2 of the present invention, the information processing device of Aspect 1 may be configured such that the acceleration of the electronic device in the longitudinal direction satisfies the predetermined condition in a case where a ratio of (i) the acceleration of the electronic device in the longitudinal direction to (ii) an acceleration of the electronic device is greater than or equal to a predetermined value.

The above configuration makes it possible to carry out lifting determination in a case where (i) the angle of the longitudinal direction of the electronic device with respect to the vertical direction is less than or equal to the predetermined value and (ii) the electronic device has moved in the longitudinal direction. When the electronic device has been moved in the longitudinal direction, there is a high likelihood that the electronic device has been lifted. The above configuration therefore makes it possible to carry out lifting determination accurately.

The predetermined value for the ratio can be set to a value at which it is likely that the electronic device has been lifted in the longitudinal direction. For example, the predetermined value can be 0.3 to 1.0.

In Aspect 3 of the present invention, the information processing device of Aspect 1 or 2 may be configured such that the angle determination section determines that the angle of the longitudinal direction of the electronic device with respect to the vertical direction is less than or equal to the predetermined value in a case where the acceleration of the electronic device in the longitudinal direction exceeds 0.8 g (where g represents gravitational acceleration).

The above configuration makes it possible to appropriately determine whether or not the longitudinal direction of the electronic device is in a nearly perpendicular state, i.e., whether or not the electronic device is positioned upright.

An electronic device in accordance with Aspect 4 of the present invention may be configured so as to include: an information processing device in accordance with any one of Aspects 1 to 3; and an acceleration sensor configured to detect an acceleration.

The above configuration brings about effects similar to those of Aspect 1 above.

A method of controlling an information processing device in accordance with Aspect 5 of the present invention is a method of controlling an information processing device provided in an electronic device, including: an angle determining step of determining whether or not an angle of a longitudinal direction of the electronic device with respect to a vertical direction is less than or equal to a predetermined value; and a lifting determination step of determining whether or not the electronic device has been lifted, the lifting determination being carried out in (i) a case where the angle of the longitudinal direction of the electronic device with respect to the vertical direction is greater than the predetermined angle and (ii) a case where (a) the angle of the longitudinal direction of the electronic device with respect to the vertical direction is less than or equal to the predetermined angle and (b) an acceleration of the electronic device in the longitudinal direction satisfies a predetermined condition.

The above method brings about effects similar to those of Aspect 1 above.

The information processing device in accordance with each aspect of the present invention may be realized by a computer. The scope of the present invention therefore encompasses a control program for the information processing device which program realizes the information processing device by the computer by causing the computer to operate as each section (software element) of the information processing device, and a computer-readable storage medium in which the control program is stored.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Mobile terminal (electronic device)
10 Control section (information processing device)
11 Acceleration sensor
52 Lifting control section
53 Function execution section
61 Acceleration determination section
62 Angle determination section
63 Standstill determination section
64 Movement determination section
65 Lifting determination section

The invention claimed is:

1. An information processing device provided in an electronic device, the information processing device comprising:
an angle determination section configured to determine whether or not an angle of a longitudinal direction of the electronic device with respect to a vertical direction is less than or equal to a predetermined value; and
a lifting determination section configured to determine whether or not the electronic device has been lifted, the lifting determination section carrying out determination in (i) a case where the angle of the longitudinal direction of the electronic device with respect to the vertical direction is greater than a predetermined angle and (ii) a case where (a) the angle of the longitudinal direction of the electronic device with respect to the vertical direction is less than or equal to the predetermined angle and (b) an acceleration of the electronic device in the longitudinal direction satisfies a predetermined condition,
wherein the angle determination section determines that the angle of the longitudinal direction of the electronic device with respect to the vertical direction is less than or equal to the predetermined value in a case where the acceleration of the electronic device in the longitudinal direction exceeds 0.8 g (where g represents gravitational acceleration).

2. The information processing device according to claim 1, wherein the acceleration of the electronic device in the longitudinal direction satisfies the predetermined condition in a case where a ratio of (i) the acceleration of the electronic device in the longitudinal direction to (ii) an acceleration of the electronic device is greater than or equal to a predetermined value.

3. An electronic device comprising:
the information processing device in claim 1; and
an acceleration sensor configured to detect an acceleration.

4. A method of controlling an information processing device provided in an electronic device, comprising:
determining whether or not an angle of a longitudinal direction of the electronic device with respect to a vertical direction is less than or equal to a predetermined value; and
determining whether or not the electronic device has been lifted, the lifting determination being carried out in (i) a case where the angle of the longitudinal direction of the electronic device with respect to the vertical direction is greater than a predetermined angle and (ii) a case where (a) the angle of the longitudinal direction of the electronic device with respect to the vertical direction is less than or equal to the predetermined angle and (b) an acceleration of the electronic device in the longitudinal direction satisfies a predetermined condition;
wherein the angle of the longitudinal direction of the electronic device with respect to the vertical direction is determined to be less than or equal to the predetermined value in a case where the acceleration of the electronic device in the longitudinal direction exceeds 0.8 g (where g represents gravitational acceleration).

5. A non-transitory computer-readable storage medium that stores a control program for causing a computer to function as an information processing device in claim 1, the control program causing the computer to function as the angle determination section and the lifting determination section.

* * * * *